United States Patent
Worthen

[15] 3,703,183
[45] Nov. 21, 1972

[54] TURBINE SPEED CONTROL
[72] Inventor: Richard A. Worthen, Greensburg, Pa.
[73] Assignee: Carrier Corporation, Syracuse, N.Y.
[22] Filed: Feb. 11, 1971
[21] Appl. No.: 114,428

[52] U.S. Cl. .....................137/47, 251/64, 267/151
[51] Int. Cl. ..............................................G05d 13/40
[58] Field of Search .......137/47, 58; 251/64; 415/42, 415/43; 91/366, 387; 267/151, 156

[56] References Cited

UNITED STATES PATENTS 2,808,042  10/1957  Thorner....................137/58 X
3,222,046  12/1965  Thorner.....................267/156
3,161,068  12/1964  Bar-on....................267/156 X
3,416,431  12/1968  Hitzeroth...............267/156 X Primary Examiner—Robert G. Nilson
Attorney—Harry G. Martin, Jr. and J. Raymond Curtin

[57] ABSTRACT

The position of the valve controlling the supply of fluid operating a prime mover, such as a turbine, is determined by a force produced by a speed control mechanism. The level of the applied force is proportional to the speed of the prime mover. A variable force spring and a constant force spring are connected in parallel relation and conjointly opposes the force produced by the control mechanism.

1 Claim, 4 Drawing Figures

PATENTED NOV 21 1972　　3,703,183

*INVENTOR.*
RICHARD A. WORTHEN
BY
ATTORNEY

TURBINE SPEED CONTROL

BACKGROUND OF THE INVENTION

Fluid operated prime movers, as for example steam turbines, are provided with some form of mechanism operated by the prime mover to maintain the speed thereof within close limits to a predetermined speed set point, regardless of changes in the load which the prime mover is handling. Such mechanisms are referred to generally as governors and, conventionally, include means operable to position a valve supplying the energizing fluid to the prime mover in response to the speed thereof. The control means operates to urge the valve toward close position. The control means may consist of any arrangement which will increase the force applied to the valve in proportion to increase in the speed of the prime mover. Such arrangement may be in the form of a fly-ball structure, a fluid pump, or mechanism for generating an electric current, the level of which changes in proportion to the speed of the prime mover.

In any event, the force produced by the control means is opposed by a variable force spring means. Due to the fact that magnitude of resistance of the variable force spring increases, when force is applied against the spring. Such a governor arrangement provides poor regulation, has slow speed of response, and other drawbacks.

This invention has as an object a governor mechanism having improved regulation, and is more quickly responsive to speed changes in the prime mover.

SUMMARY OF THE INVENTION

The variable force spring means is replaced by spring system including a constant force spring, and a variable force spring. These springs are connected in parallel relationship and operate to conjointly oppose the force created by the control means.

DESCRIPTION OF THE PREFERRED EMBODIMENT

Figure 1:
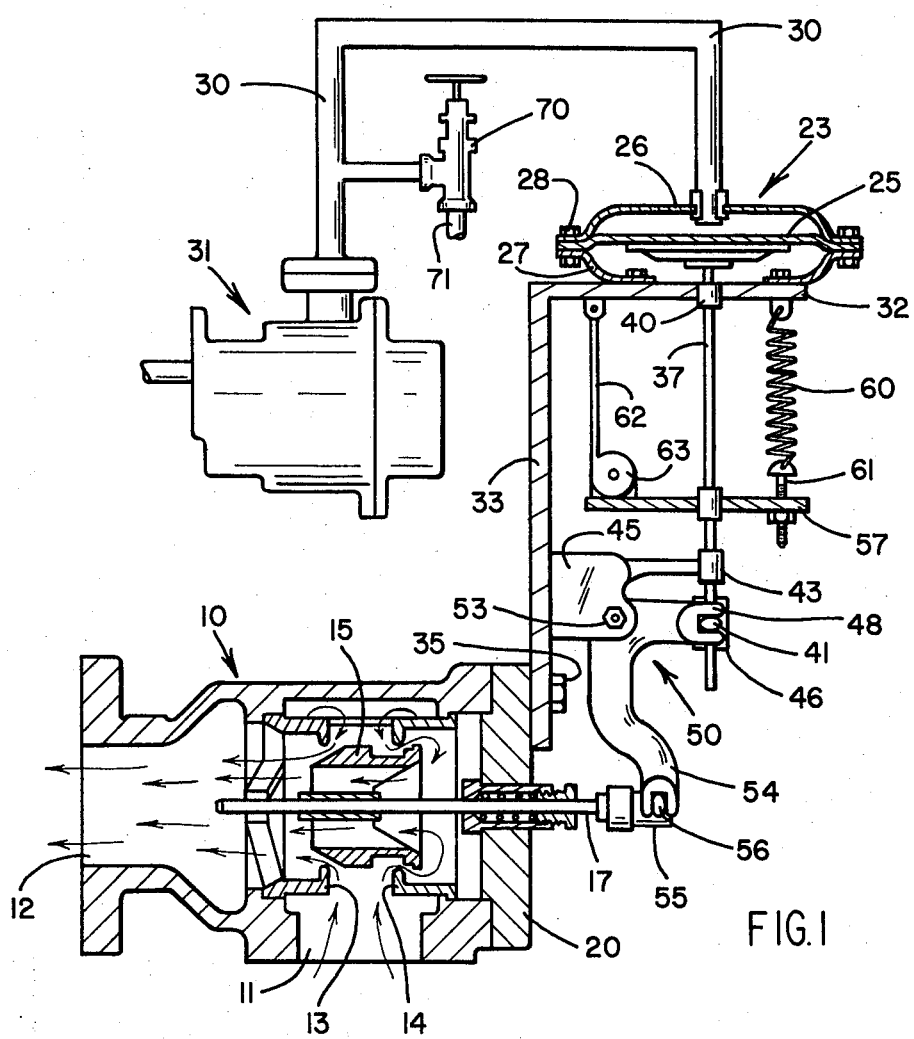
FIG. 1 is an illustration of a form of speed control mechanism embodying my invention.

In the drawing, 10 designates a valve supplying fluid, such as steam, to a prime mover, such as a steam turbine. The valve body is formed with an inlet 11 and an outlet 12. The valve illustrated in the drawing is provided with dual seats 13, 14. A valve element 15 is formed with axially spaced apart seat engaging surfaces which upon movement of the valve element to the left engage the seats 13, 14 closing off the flow of fluid from the inlet 11 to the outlet 12. It will become apparent the invention may be used with valves embodying other constructions.

The valve element 15 is fixed to a stem 17 extending outwardly through the end wall 20 of the valve body.

In the arrangement shown in the drawing, the valve element 15 is moved toward the seats 13, 14 by a diaphragm type actuator 23 operatively connected to the stem 17 through an appropriate linkage. The actuator 23 consists of a flexible diaphragm 25, the peripheral marginal area of which is clamped between retaining members 26, 27 as by bolts 28. The upper retaining member 26, in conjunction with the diaphragm 25, forms a closed fluid tight chamber which has communication with a conduit 30 extending to the outlet of a pump 31 driving connected to the power shaft of the turbine.

The lower retaining member is mounted on a laterally extending arm 32 of a bracket 33 fixed to the end wall 20 of the valve as by screws 35. A stem 37 is fixed, at its upper end, to the diaphragm 25, and extends downwardly therefrom and is slidably mounted in a guide 40 carried by the bracket arm 41, and a lower guide 43 projecting from a support 45 fixed to the bracket 33.

A block 46 is secured to the lower end portion of the stem 37, and is adjustable axially thereof. The block 46 is mounted in the bifurcated end of the arm 48 of a bell crank lever 50. The block is provided with a pin 41, the ends of which extend into slots formed in the bifurcated end of the lever. The bell crank lever 50 is pivotally mounted at its bight to the bracket extention 45 as by bolt 53. The depending arm 54 of the lever is also bifurcated and slotted to receive the block 55 and pin 56. The block 55 is secured to the valve stem 17 and is adjustable axially thereof.

A cross member 57 is fixed to the stem 37. A helical tension spring 60 is fixed at one end to the arm 32 of the support bracket 33. The opposite end of spring 60 is attached to a member 61 carried by the cross member 57 and adjustable to vary the tension on the spring. A constant force spring 62, of which the well known Negator spring is an example, is fixed at one end to the bracket arm 32, and the spring housing 63 is fixed to the cross member 57. The spring combination 60, 62 is calibrated and adjusted to position the valve 15 for the flow of fluid therethrough for operation of the turbine at the speed set point. That is with the turbine operated at the speed set point, the pump 31 will produce a pressure on the upper side of the diaphragm 25 sufficient to move the diaphragm, and the stem 37, downwardly against the opposing force of the spring 60, 61 to so position the valve 15.

An increase of the speed of the turbine, and accordingly the pump 31, will raise the pressure in the conduit 30 proportionately, effecting further downward movement of stem 37 and movement of the valve 15 toward closed position. As the speed of the turbine decreases the pressure on diaphragm 25 will decrease proportionately, whereupon springs 60, 62 will move the stem 37 upwardly and move the valve 15 further toward open position.

Figure 2:
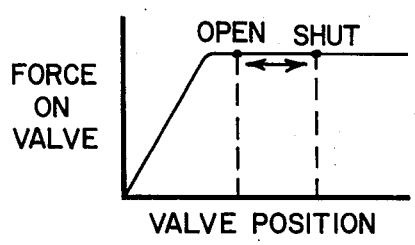
FIG. 2 is a graph illustrating the operation of the valve with only a constant force spring.

Referring to the graph in FIG. 2, it will be seen with the use of the constant force spring the applied force from the fluid pressure on the diaphragm 25 will be either greater or smaller than the opposing force of the spring 62. Accordingly, the valve will be in the full open or closed position. With this arrangement the speed control will be significantly unstable.

Figure 3:
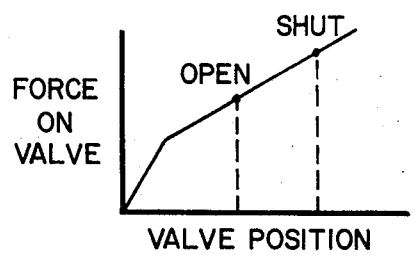
FIG. 3 is a graph illustrating the operation of the valve with only a conventional variable force spring.

On the other hand, with only the conventional variable force spring 60, which provides a force increasing as the valve 15 is moved towards closed position, stability is obtained. However, this arrangement requires a wide range of speed variation between the open and closed positions of the valve as shown by the graph in FIG. 3.

Figure 4:
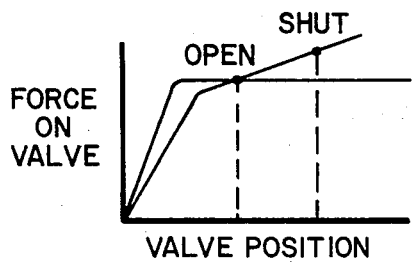
FIG. 4 is a graph illustrating the operation of the valve under the conjoint influence of the constant force spring and the variable force spring in accordance with my invention.

The graph in FIG. 4 illustrates the operational characteristics with the combination of the springs 60, 62. With this arrangement, the speed control is responsive to a smaller variation in the speed of the turbine, resulting in a more rapid adjustment of the valve 15, whereby equilibrium between the flow of fluid to the turbine and the load demand placed upon it is more quickly restored.

The variable force spring 60 is selected such as to have a rate to be the minimum necessary, in conjunction with the constant force spring 62, to establish desired stability. The variable force spring 60 also provides for the convenient change in speed setpoint by simply adjusting the position of the member 61 relative to the cross member 57.

In the arrangement illustrated in FIG. 1, a bleed-off valve 70 is connected to the conduit 30 and may be manually adjustable for the discharge of fluid from the conduit 30 through the conduit 71 to the oil reservoir associated with the pump 31. The valve 70 also serves as a means to vary the speed setpoint of the control mechanism. It also establishes the force or pressure in the line 30 proportional to the turbine speed. As stated above, a small increase in the force developed by the pump 31 will move the valve 15 toward closed position with a small increase in turbine speed and this effects better turbine speed regulation.

While I have described a preferred embodiment of the invention, it is to be understood the invention is not limited thereto since it may be otherwise embodied within the scope of the following claims.

I claim:

1. A valve movable between open and closed positions for controlling the flow of fluid to a prime mover for the operation thereof, valve control means operable to produce force applied to said valve to urge the same to closed position, the magnitude of said force being in accordance with the speed of the said prime mover, a variable force spring and a constant force spring, said springs being connected to said valve in parallel relation for conjointly opposing the force produced by said control means.

* * * * *